Figure 4:
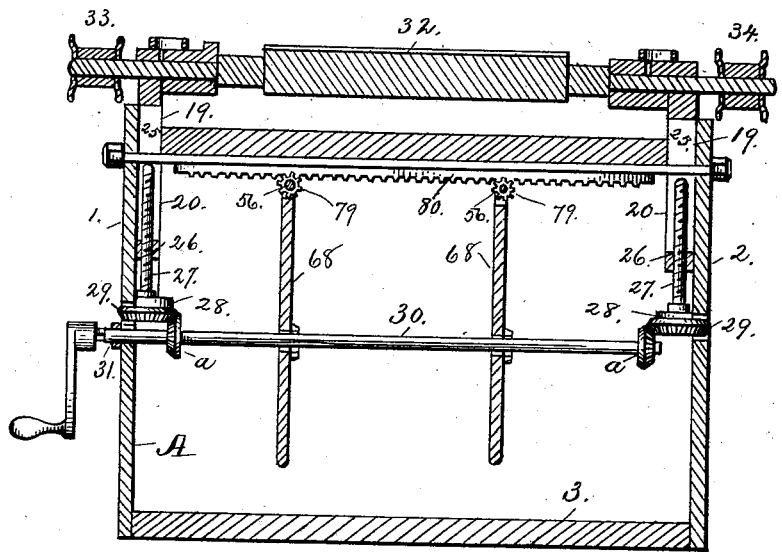

(No Model.)
S. J. & G. J. SHIMER.
G. APPLEGATE & L. A. SHIMER, Administrators of G. J. SHIMER, Dec'd.
PLANER.
No. 367,674.
Patented Aug. 2, 1887.
5 Sheets—Sheet 1.
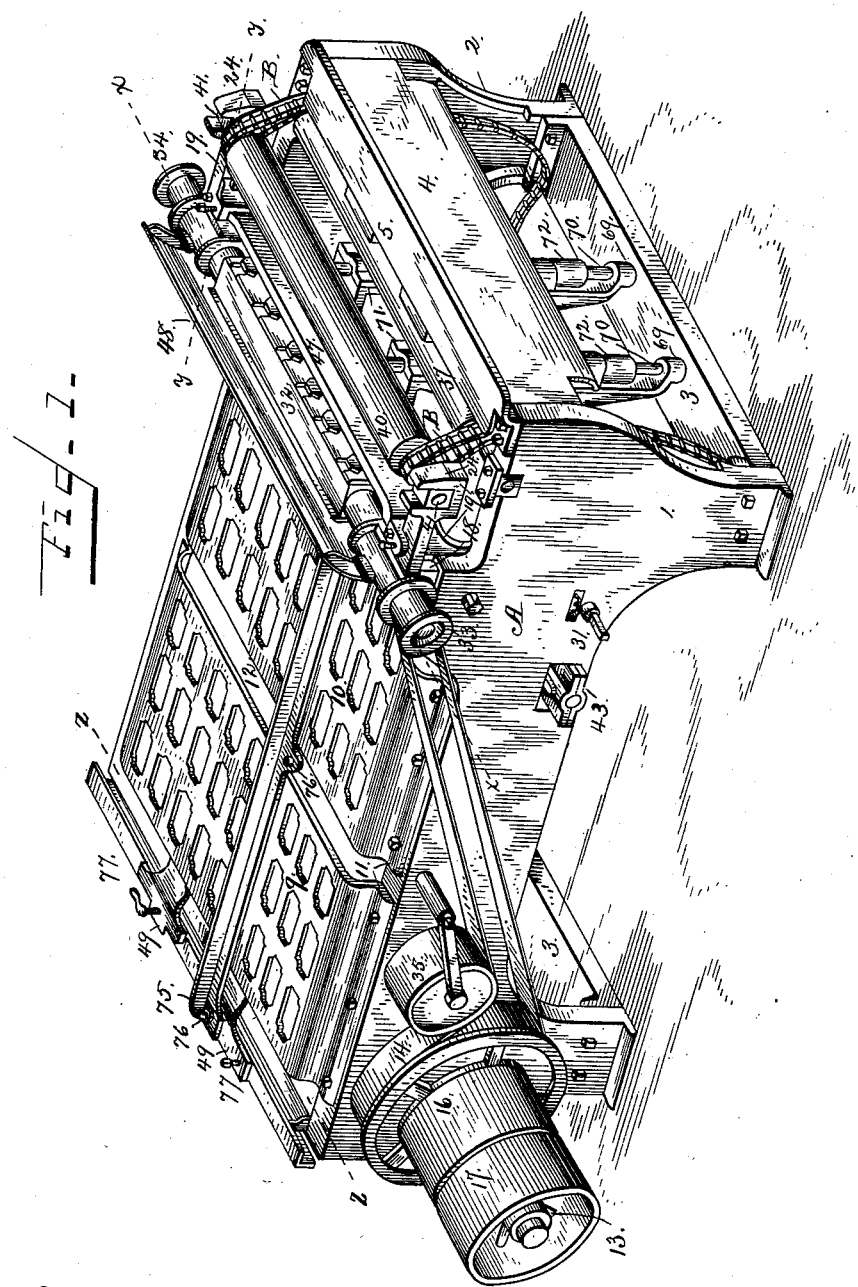

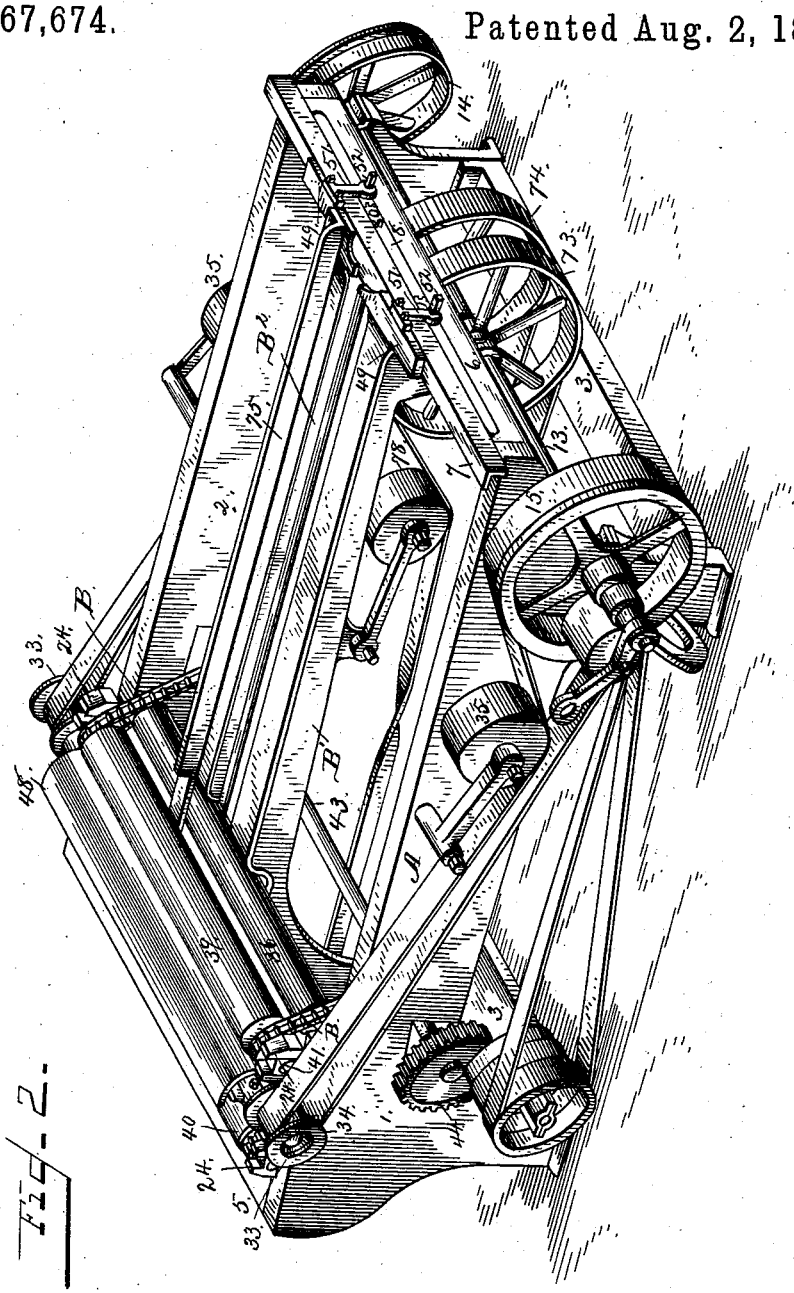

(No Model.)  5 Sheets—Sheet 3.

S. J. & G. J. SHIMER.
G. APPLEGATE & L. A. SHIMER, Administrators of G. J. SHIMER, Dec'd.
PLANER.

No. 367,674. Patented Aug. 2, 1887.

(No Model.) 5 Sheets—Sheet 4.

S. J. & G. J. SHIMER.
G. APPLEGATE & L. A. SHIMER, Administrators of G. J. SHIMER, Dec'd.
PLANER.

No. 367,674. Patented Aug. 2, 1887.

(No Model.) 5 Sheets—Sheet 5.
S. J. & G. J. SHIMER.
G. APPLEGATE & L. A. SHIMER, Administrators of G. J. SHIMER, Dec'd.
PLANER.
No. 367,674. Patented Aug. 2, 1887.
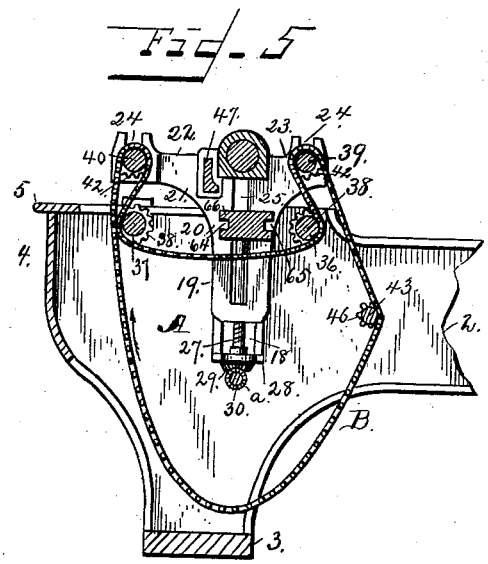
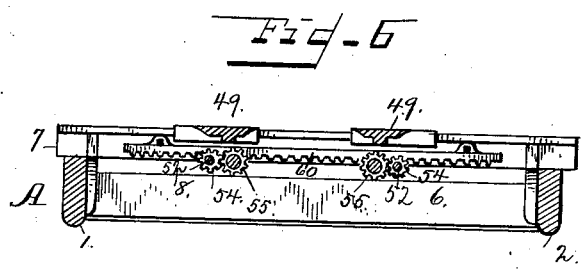
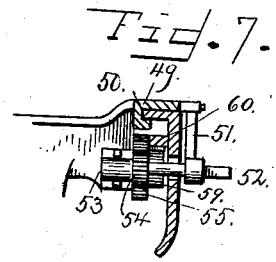

UNITED STATES PATENT OFFICE.

SAMUEL J. SHIMER, OF MILTON, PENNSYLVANIA; GEORGE APPLEGATE AND LENNIA A. SHIMER, OF BETHLEHEM, PENNSYLVANIA, ADMINISTRATORS OF GEORGE J. SHIMER, DECEASED; SAID APPLEGATE AND L. A. SHIMER ASSIGNORS TO SAID SAMUEL J. SHIMER.

PLANER.

SPECIFICATION forming part of Letters Patent No. 367,674, dated August 2, 1887.

Application filed October 21, 1886. Serial No. 216,791. (No model.)

*To all whom it may concern:*

Be it known that SAMUEL J. SHIMER, a citizen of the United States of America, residing at Milton, in the county of Northumberland and State of Pennsylvania, and GEORGE J. SHIMER, in his life-time late a citizen of the United States of America, and a resident of Bethlehem, in the county of Northampton, State of Pennsylvania, (deceased,) made a new and useful invention in Wood-Working Machines, of which the following is a specification.

This invention has relation to improvements in planers, or machines for planing flat surfaces of board stuff; and the object is to adapt an improved adjustable chain-feed to the planing mechanism, whereby the tension of the feed-rollers will automatically conform to the variations or differences of the thickness in the stuff being planed without endangering the integrity of the mechanism.

The invention consists in the novel construction of parts and their combination, as will be hereinafter fully described, and specially as the same is pointed out in the claim made hereto.

The improvements are fully and clearly illustrated in the accompanying drawings, forming a part of this specification, wherein—

Figure 1 is a perspective view of the planer, looking from the front. Fig. 2 is a perspective view looking from the rear, the bed-plates being removed to show the adjustable arms which carry the matching-cutters. Fig. 3 is a longitudinal sectional view, in elevation, showing one of the adjustable arms, with the cutter-head spindle, the vertically-adjustable bracket carrying the upper rollers, and the planer-knife head, the chain-feed of that side being also partially demonstrated. Fig. 4 is a transverse sectional view taken vertically on the line *x x* of Fig. 1, and showing the mechanism for adjusting the brackets which carry the upper rollers and planer-head. Fig. 5 is a longitudinal sectional view, in elevation, taken on the line *y y* of Fig. 1, and showing the arrangement of the rollers and the chain-feed. Fig. 6 is a transverse sectional view on the line *z z* of Fig. 1, to show the rack-bar and the gear-wheels which adjust the arms carrying the matcher-heads; and Fig. 7 is a detail view, partly in section, showing the arrangement of the adjusting mechanism on the arms carrying the matcher-heads.

In the drawings similar notations refer to like elements of parts, and reference being thereto had, the letter A designates the frame of the machine, consisting of substantial metal side pieces, 1 2, formed with apertures through which such shafts as project across the frame are arranged, and with box-seats for the journals of the shafts and lower feed-rollers. The legs or standards of the side pieces of the frame are bound together by cross-pieces 3, having end flanges through which and the legs are fastening bolts, substantially as seen in the drawings. The front end is additionally girded by a cross piece or plate, 4, and a top plate, 5, on which or to which the end of an auxiliary table (not shown) is laid or secured, so that the stock as it is carried through the machine runs out thereon. The rear end of the machine is girded at the upper part by a cross-piece, 6, which is flanged at 7 to set over the gears which operate the adjustable arms which carry the spindles and cutter-heads for matching the stuff, or other side cutters. In the cross-piece 6 is a slot, 8, in which the neck of the turning-gear is projected and slides, as will be hereinafter more fully specified.

On the top of the side pieces are secured the bed, consisting of two metal plates, 9 10, having their ends turned down and flanged, as at 11, and secured to the edges of the side pieces of the frame by screw-bolts. These metal bed-plates are arranged with an opening, 12, between their inner edges, to afford an opening for the middle bolt of the gage-bar, which holds it to the carrying bar or arm of one of the cutter-heads.

The numeral 13 designates the driving-shaft mounted across the machine in proper bearings, and carrying on it, next to the frame and on each side thereof, belt-pulleys 14 15, the one end of the driving-shaft being extended and having mounted thereon the fixed driving-pulley 16 and the loose pulley 17, which have connection by belt (not shown) to the power. On the inner side of each side piece of the frame, at that part over which the feed-rollers and planer-knives are mounted, is formed a vertical sleeve, 18, the metal of the side pieces being extended at this point, as shown, to prevent the feed-rollers and planer-knife from being dropped down too far. In each of the vertical sleeves 18 is arranged a vertically-adjustable bracket or carrying-piece, 19. This adjustable bracket is formed with a vertically-depending standard, 20, adapted to fit in the sleeve 18, and on the top of the standard 20 is formed a cross-head, 21, projected horizontally in both directions from the standard and at right angles thereto, forming arms 22 23. In this cross-head, at the middle, is formed a bearing-seat for the shaft of the planer-head, and in the ends of each horizontally-projected arm is a bearing-box seat, 24, in which the bearing-boxes of the respective upper feed-rollers are arranged. In the standard 20 is formed a vertically-arranged slot, 25, and the bottom piece below the slot is provided with a threaded hole, 26, into which is fitted an adjusting-screw, 27. This screw is held in a collar, 28, formed on or secured to the side pieces of the frame, with the stem of the screw projected through the threaded end of the standard and into the slot thereof. The end of the screw below the supporting-collar is formed or provided with a bevel gear-wheel, 29.

Projected across the machine and mounted in bearings in side pieces is a shaft, 30, which has its end projected, as at 31, and formed to take a wrench or crank, by which it may be revolved. On this shaft 30, arranged to mesh with the bevel-gear on the screws of the adjustable standards, are small bevel gear-wheels *a*.

It will be perceived from the foregoing that by turning the shaft 30 the screws in the brackets are operated, and the stems of the brackets, with the elements or parts mounted on the cross-heads, may be thus raised or lowered, the cut and the pressure both being regulated thereby or adjusted.

The numeral 32 designates the planer-head, which may be of any of the approved styles of construction. It is shown as consisting of a rectangular head, with four knives adjustably secured thereon. The journals of this head are mounted in bearings in the middle of the cross-heads of the brackets and directly over the standards. The ends of the shaft of the head are extended and have pulleys 33 34 fixed thereon, the former of which is belted to the main pulley 14, and the latter similarly connected to the other main pulley, 15. Tighteners 35 are hung in frames pivoted to the sides of the machine and arranged to bear on the upper line of the belting.

The numeral 36 designates the lower rear feed-roller, and 37 the forward lower feed-roller. These are mounted in bearings arranged substantially as shown in the side pieces of the frame, and have formed on necks between the bearings and the shoulder of the rollers sprocket or small gear teeth 38, to engage the links of the feed-chain. These lower rollers are not adjustable in their bearings, being held therein by box-caps or other suitable means.

The numeral 39 designates the rear upper feed-roller, and 40 the forward upper feed-roller. These are mounted in the box-seats in the arms of the cross-head of the adjustable brackets, and have closed bearing-boxes 41, which are seated in the box-seats of the said arms, and are loose therein in order that the rollers may automatically seat themselves on the stock and adapt themselves to any and all variances in thickness or other unevenness of the stock. The upper feed-rollers have necks with sprockets 42 between the shoulders of the rollers and their bearings, same as heretofore mentioned in the construction of the lower feed-rollers.

Mounted in proper bearings in the frame is the feed-shaft 43, carrying on the projected end a gear-wheel, 44, which meshes with a gear (not shown) on the driving-shaft, and fixed on the shaft, to align with the sprockets on the necks of the feed-rollers, are small sprocket-wheels 46, constituting the driving-wheels of the feed.

A special and important element or feature of this invention is the novel attainment of the weight or pressure necessary to be exerted by the feed-rollers upon the stock in order to carry it through the machine by means of the driving mechanism which rotates the feed-rollers. This is consummated by means of an endless chain arranged about the necks of the feed-rollers, whereby not only motion is imparted to the feed-rollers, but a pressing or weight function is given to them to an extent always sufficient to overcome the resistance, and assuring a positive feed-power. Under this arrangement the strength of the feed is measured by the breaking strain of the chain which rotates the rollers, and of course must be greater than the frictional resistance of the board or stock in the machine, since if the propelling-power of the rollers on the stock be sufficient to simply overcome the frictional resistance of the stock, the feed-rollers may slip and the stock fail to be pushed forward; hence the rollers must be weighted, as has heretofore been customary, or a pressure applied thereto by other means.

Heretofore the weights imparting the pressure have been independent elements, and not connected to the positive or motive power nor operatively associated therewith. Therefore it often happens that the stock sticks or stops while the rollers are in full motion, evidencing that the weight power is not great enough, or that its limit of effectiveness is reached. The machine is greatly simplified and this difficulty overcome by the introduction of the chain-feed in the present machine, as by the arrangement of the chain on the feed-rollers I dispense with the weights heretofore used, and combine the equivalent for the weights in the motive or positive power by which the rollers are actuated.

It is essential that the weight-power and the motive power combined shall be about equal to the breaking strain of the chain, but preferably the weight power may be greater than the motive power, in order that no slip may occur in the feed, and for that reason the necks of the feed-rollers with the sprockets are made smaller than the body of the rollers; and it has been found by practical experiments that the best results are obtained when the axial line of the driving sprocket-wheel is located within a certain limited arc—to wit, within an arc bounded by lines about twenty degrees and forty-five degrees to one side of a vertical line passing through the axis of the first upper feed-roller—and that when thus located it imparts the requisite pull to the drive-chain.

Describing the mechanism designed to effectuate these ends, the letters B designate the chains which constitute the tensible chain-feed. These are arranged on all of the feed-rollers about the sprocket-necks over the feed-sprocket. The arrangement of the chains is best demonstrated in Fig. 5 of the drawings, on reference to which it will be seen that the chain rests on the feed-sprocket, thence over the upper forward feed-roller, thence crossed under the same and under the lower front feed-roller, thence carried across under the cross-piece of the machine under the lower rear feed-roller, thence forward, and back over the upper rear feed-rollers to the feed-sprocket. This chain-feed gives motion to the feed-rollers in unison with the same certainty as cog-gear, but with adjustability not found in cog-gear feed. The peculiar adjustment of the chain on the feed-rollers imparts to them a synchronous revolution derived from the feed-sprocket, yet the stretching or giving quality of the chain permits them to check or give without the jeopardy and uncertainty accompanying a yielding or variable cog-gear, the upper feed-rollers being mounted in bearing-boxes arranged to move up and down in their seats whenever the exigency happens which lifts the roller or causes it to drop, the pressure being adjusted and the movements admissible by reason of the sag in the lower line of the chains. When the rollers are lifted by variances in the stock, the tension of the drive-chain, as well as the power of the feed, is increased, and this is as it should be in practice.

It will be further stated in this connection that a function is reached by the adjustment and arrangement of the feed-sprocket which carries the chain and drives the feed-rollers. This driving or feed sprocket must be placed in relation to the upper rear feed-roller to fall within an angle of forty-five degrees, so that the upper roller is made to ride the stock and is pressed on the face thereof by a pull motion of the drive-sprocket, thus utilizing, as heretofore stated, the power that gives it motion as a weight power, and at the same time utilizing only so much of such weight power as may be necessary to overcome the resistance which operates against the passing board. Rollers with weighted levers, as heretofore in use, set on the stock with a uniform pressure, and spring-rollers are variable in their force; but under the arrangement of this tensible chain-feed this rear upper roller is free to take any position that the upper surface of the passing board gives it. In the combination with the drive or sprocket feed a weight function is attained which answers all purposes. The mechanism to control weighted levers is therefore dispensed with and a lighter roller used.

From the foregoing description and on reference to the drawings, particularly Fig. 5, it will be seen that the driving-chain passes directly from one of the adjustable rollers to the driving-sprocket, so that the pull of the chain presses the roller down upon the stock more effectively than were it to pass over an intermediate idler, or were the sprocket on the lower fixed feed-roller, in either of which cases the tension of the chain would be largely borne by the last roller over which it passed, and would not operate to force the feed-roller upon the board.

It will be further observed that each strand of the lower bight of the driver-chain is supported directly by one of the two upper feed-rollers, whereby the chain as it passes to and from the movable adjustable rollers tends to force them upon the stock as it is fed through the machine.

An adjustable pressure-bar, 47, is secured in front of the planer-head, and back of the planer-head is secured a shield or shoe, 48. These are both of the usual construction and are secured to the frame by any proper means.

The letters B' and B² designate adjustable carrying-arms, in the forward ends of which the spindles of the matcher-heads are arranged. These carrying-arms are duplicates in construction, and therefore the same notations refer to the elements or parts carried by each. These carrying-arms extend from the rear end of the frame to well in front of the planer-head, as is seen in Fig. 3 of the drawings. More specially describing their construction, the numeral 49 designates a sliding bracket formed on the rear end of the carrying-arm and having a recess, 50, to set over the edge of the top plate of the frame. (See Fig. 7.)

To the outer edge of the sliding bracket is secured an arm, 51, through the lower end of which, and through the slot in the cross-piece of the frame, is passed a shaft, 52, having its inner end journaled to the carrying-arm, as at 53. On this shaft 52 is fixed a gear-wheel, 54, which meshes with a gear-wheel, 55, mounted on a shaft, 56, journaled to the carrying-arm at 57 58, on the rear end of which is a smaller gear-wheel, 59, which meshes with a rack-bar, 60, secured against the inner face of the cross-piece of the frame. On the forward end of shaft 56 is a small gear-wheel, 79, which meshes with a rack-bar, 80, on the cross-piece 66, by means of which the forward end of the carrying-arm is moved in alignment with the rear end.

A crank-arm is detachably applied to the short shaft 52 for operating the mechanism. The forward end of the carrying-arm is formed with upwardly-turned flanges 62 63, which are fitted to set and slide in the recesses 64 65 of the cross-piece 66, secured in the frame, and the arm is extended forward, forming a bracket, 67, on the upper end of which the auxiliary table may be laid, and extending downward is the arm 68, terminating in a vertically-arranged bearing, 69, in which the foot of the spindle 70 sets, the upper part of the said spindle being fitted in a bearing, 71, on the end of the carrying-arm. This spindle 70 has a pulley, 72, and carries on the upper end the matcher-head. (Not shown.)

On the driving-shaft are pulleys 73 74, which are connected to the pulleys on the spindles of the matcher-heads, as best shown in Fig. 3 of the drawings. By turning the crank of either carrying-arm it may be moved as desired to set the matcher-heads to a wide or narrow board.

On the bed-plates is a gage-bar, 75, which is secured to one of the carrying-arms at its ends and in the middle by a bolt, 76, passed into the carrying-arm through the opening between the plates of the bed. This arrangement permits the carrying arm, with the gage-bar attached, to be moved without interfering with the bed-plates. When the carrying-arm is moved to the desired position, it is there held by turning down the clamping-screws 77 in the sliding bracket at the rear.

On the belts connecting the pulleys located on the driving-shaft under the frame and connecting the matcher-spindles are tighteners 78, substantially as shown.

It will be seen from the foregoing description that the mechanism has been greatly simplified and a great number of parts common to planers heretofore in use dispensed with.

I am aware that it is old to employ a chain for driving the feed-rollers in a machine for sawing laths and like articles, and hence I do not wish to be understood as claiming, broadly, a chain-driving device to be employed in rotating the feed-rollers in a wood-working machine.

What is claimed is—

1. The combination, in a planing-machine, of upper and lower feed-rollers arranged in pairs before and behind the planer-head, the upper feed-rollers being mounted in loose bearings to slide vertically and automatically, and driving-chains arranged over the necks of the upper rear feed-roller, thence carried down in engagement with a driving-sprocket, thence forward and over the neck of the upper forward feed-roller, thence carried down across and under the lower forward feed-roller, thence across horizontally and carried under the lower rear feed-roller, and thence up across the axial line of the roller and over to the upper rear feed-roller, substantially as described, and for the purpose stated.

2. The combination, with the driving mechanism and the frame of a planing-machine formed with seats or sleeves in the sides of the frame, of vertically-sliding and adjustable brackets fitted in said sleeve and formed with cross-heads provided with journal-box seats in the ends of the arms thereof, the upper feed-rollers mounted on bearings loosely seated in said journal-box seats, single endless chains arranged to rotate said rollers in unison, and a driving-shaft projected across the machine and provided with a sprocket-wheel to draw said chains and rotate the said rollers, substantially as described.

3. The combination of the lower set of feed-rollers mounted in bearings on the frame of the machine, adjustable brackets arranged in the frame to carry the upper set of rollers, the upper set of rollers disposed in said bracket with their bearings loosely disposed in seats therein, single endless chains arranged to rotate all of the said rollers in unison, and a driving-shaft with sprocket-wheels to move the chains and rotate the rollers, substantially as described.

4. The combination, with the frame of a planing-machine formed with slotted upper end piece at the rear and a forward cross-piece, of rack-bars secured to said rear and forward cross-pieces, the spindle-carrying arms formed to be supported and to slide laterally on said cross-pieces, a shaft with a gear-wheel on each end to mesh with the rack-bars, and a gear-wheel journaled on a shaft in the rear end of the carrying-arm to rotate said shaft on the carrying-arm, substantially as described.

5. The combination, with the adjustable carrying-arm arranged to move laterally in both directions, and the bed-plates of the machine arranged with a transverse opening between them, of the gage-bar secured to the carrying-arm and adjustable therewith, substantially as described.

6. The combination, in a planing-machine, of feed rollers, the upper rollers of which have their journals mounted in bearings arranged to yield automatically and perpendicular, and formed with sprockets on their necks, a driving-sprocket set to the rear of the rear feed-rollers at an angle of less than forty-five degrees from the vertical axial line of the rear upper feed-roller, and an endless chain to traverse the sprockets of the rollers and the driving-sprocket, and arranged to pull directly from the rear upper feed-roller to the driving-sprocket, substantially as described, and for the purpose stated.

In witness whereof we, the said SAMUEL J. SHIMER, and the said GEO. APPLEGATE and LENNIA A. SHIMER, administrators of the estate of the said GEORGE J. SHIMER, deceased, have hereunto set our hands in the presence of two attesting witnesses.

SAMUEL J. SHIMER,
   GEO. APPLEGATE,
    *Administrators, &c.*
   Mrs. L. A. SHIMER,
    *Administratrix, &c.*

Attest:
 H. E. BARRALL,
 LOUISA RAUCH.